United States Patent Office 3,458,947
Patented Aug. 5, 1969

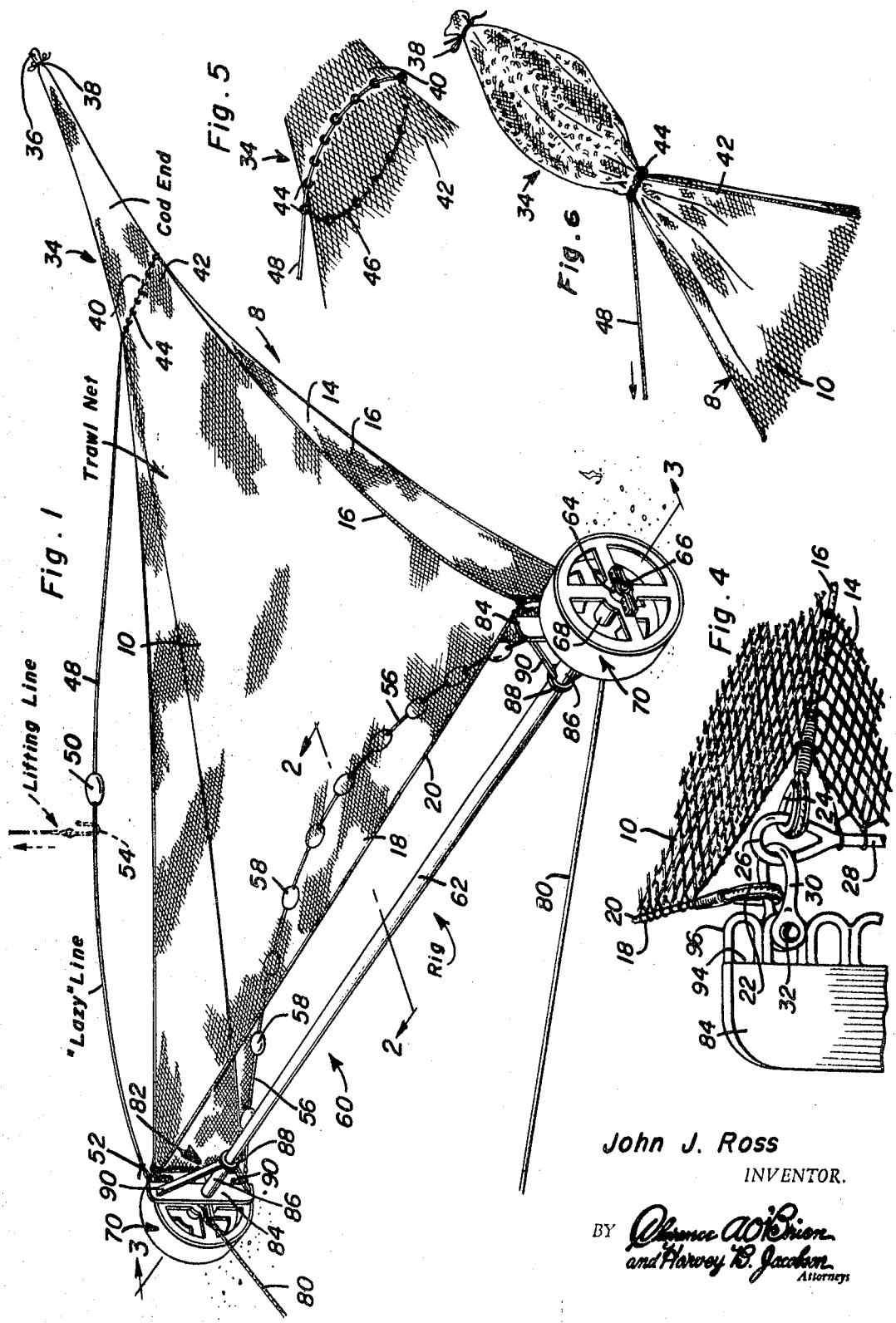

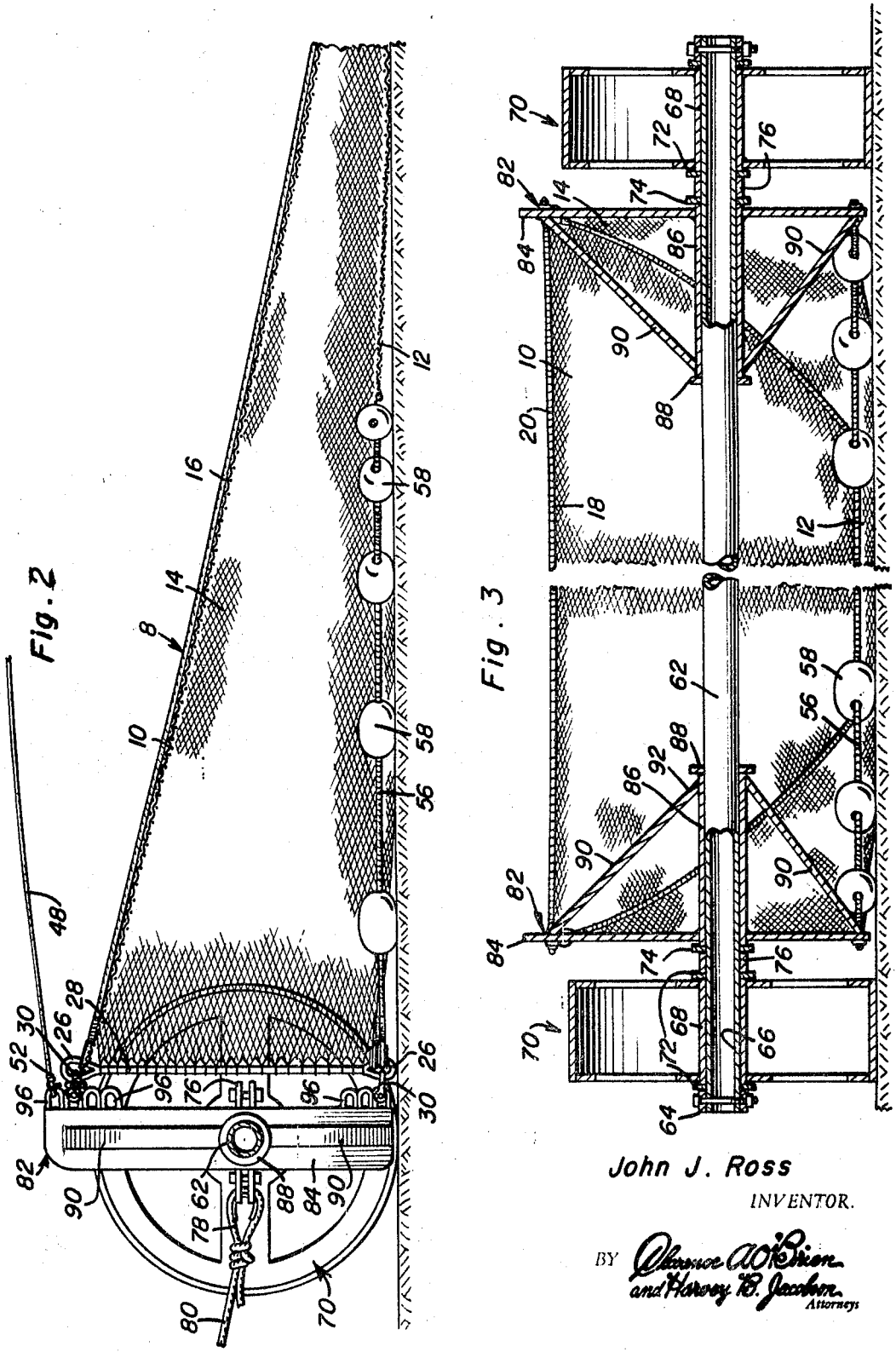

3,458,947
COMBINATION SHRIMP TRAWL AND ROLLING RIG
John J. Ross, 2304 Dantzler St.,
Moss Point, Miss. 39563
Filed Feb. 15, 1968, Ser. No. 705,753
Int. Cl. A01k *73/08, 73/02*
U.S. Cl. 43—9                                    10 Claims

ABSTRACT OF THE DISCLOSURE

A shrimp trawl net is provided at its open mouth end with a shaft spanning the same substantially midway between the upper and lower edges thereof. The shaft is provided at each end with a wheel and inwardly of each wheel a spreader plate is provided for connection to the net.

---

This invention relates to that field of endeavor which has to do with shrimp trawling and wherein the customarily used individually dragged trawl boards or otter boards are dispensed with and the mouth of the net is propped wide open by spreaders cradled on the respective end portions of a shaft embodied in and constituting a component part of a rolling wheel-supported trawl net maneuvering rig.

Persons conversant with the art under advisement are aware that most shrimp trawls are equipped with otter boards (also referred to as trawl boards or doors) which work independently, drag on the bottom or bed of the water, and are bridled in one manner or another so as to spread the openable forward end or mouth of the trawl. Usually a fixed speed is set and followed by the trawl pulling vessel. In the invention herein comprehended, the speed of the vessel is of little or no consequence for the reason that it has no bearing on the constantly spread mouth of the net. The fact that the wheeled trawl-equipped rig will effectually cope with ever varying terrain makes it feasible and practical to move faster and with a less powerful vessel and to cover more area in the time allotted to a given fishing period, say one day's fishing time.

It is significant to point out at the outset that the combined trawl net and simple two-wheeled spread-equipped rig has been experimentally and repeatedly used and catches less unwanted fish than ordinary and competitive shrimp trawls. In fact, in one typical test the rolling rig trawl herein covered caught about 50 pounds of unwanted fish compared to another structural type which was pulled along simultaneously and caught some 800 pounds of unwanted fish. Manifestly, the less unwanted fish caught with the shrimp, the more advantageous the result. Also handling time and labor is saved. Then, too, my shrimp trawl catches certain species of shrimp in daylight hours which are seldom trapped in significant quantities by other trawls commonly used in the industry. Further, the carriage-like rig, more particularly, the shaft, wheels thereon, and rocking-type spreader units, which are inwardly of the wheels, generates vibratory noises forwardly of the net that are known to scare and divert unwanted fish away from the mouth of the net, whereby to minimize the intake of unwanted fish.

Many and various types of trawl nets have been revealed in broadly analogous prior patents. For general background information the reader can, if so desired, refer to the patent of one Willie H. Ross which has to do with a so-called net drag and spreader, Patent 2,300,178. This prior patent, as known, did not meet with widespread adoption or use for the reason that it could not be regulated or adjusted to remain properly on the terrain traversed. The mobile transporting skid-equipped carriage or rig would either dig into the bed or bottom or float away therefrom if the speed of the towing vessel was varied or the flow of the water varied too much.

Also, the patented "drag" is a relatively small device commonly used in the industry many years ago (but since abandoned) to take a random sample of the amount of fish and shrimp being caught while the main large trawl was overboard. This random sample allowed the captain and crew to determine whether or not the large trawl had the opportunity of catching shrimp or fish, or both, or how many were present on the bottom being dragged. The "drag" was pulled up approximately every five minutes, with the main trawl staying overboard. In the event the "drag" came up with some shrimp, then it was obvious that shrimp were in the vicinity and the main trawl would catch same. In the event the "drag" came up with nothing in it, the boat would turn into the area in which it previously brought shrimp up in the "drag." It was usually a very small device, no more than two or three feet in length. It will be noted, however, that this prior patent teaches, broadly speaking, the idea of means (unlike my invention) in the mouth of the net which functions to spread the mouth to assume and maintain an open net at all times.

Briefly, the over-all conceptual aspect of this invention is characterized by (1) a shrimp trawl net which embodies certain self-contained refinements and (2) the aforementioned two-wheeled roll-along transporting rig and its complemental spreader units to which braided rope-equipped walls of the trawl net are connectively hitched and which are constructed and arranged to prop the mouth of the net open. The top and bottom walls of the net are made of mesh nylon or equivalent netting constructed of natural or synthetic fibers or a combination thereof and the two lengthwise side walls are joined to marginal edges of the top and bottom walls by Sampson braided or plaited ropes and are also made of netting or the like primarily to promote unrestrained water circulation. The holes or passageways in the netting forming the top and bottom walls are larger than the holes in the netting forming the side walls. The twine strands in the netting forming the top and bottom walls are smaller than the twine strands forming the side walls. The leading ends of all of the built-in ropes have terminal reinforced loops for a purpose to be described. The rig comprises a horizontal shaft whose ends provide axles on which suitable roll-along wheels are journalled. The spreader units are rockably cradled, that is, mounted for limited angular rotation on the respective end portions of the shaft inwardly of the wheels and embody parallel plates radial to the shaft and equipped with hitching eyes for upper and lower clevises to which the adjacent cooperating rope loops are linked and reliably connected. Features in addition to those touched upon will be subsequently described.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of the shrimp trawl net with the intake end of the cod end open and the discharge end tied and closed and with the forward mouth portion of the net proper operatively connected with the equalizing spreaders which constitute component parts of the two-wheeled roll-along rig.

FIG. 2 is an enlarged central sectional view with parts in section and elevation detailing certain significant features and taken approximately on the plane of the section line 2—2 of FIG. 1.

FIG. 3 is a suitably enlarged view with parts in section and elevation taken centrally through the aforementioned rig on the plane of the section line 3—3 of FIG. 1.

FIG. 4 is an enlarged fragmentary view showing the upper end portion of one of the spreader unit plates and detailing the hitching eyes, clevis connected to one of the eyes and several rope loops joined together and with the clevis.

FIG. 5 is a fragmentary perspective view showing the tapered trailing end of the net proper and the forward intake end of the cod end, the encircling rings and the end portion of a "lazy" line laced through the rings in readiness to contract the cod end preparatory to lifting the same aboard the vessel for emptying.

And FIG. 6 is also a fragmentary perspective view showing the cod end still tied and loaded in readiness for lifting and with the noose gathered in the usual manner.

With reference to the assembly view in FIG. 1 it will be noted that the shrimp trawl net is denoted, generally speaking, by the numeral 8. The over-all or general appearance and shape of the net is similar to that of prior art adaptations one of which is shown in a patent to G. C. Lewis, 2,618,879, and another in a patent to Wilfred M. Bass, 2,744,350. There are however certain distinctions in the net herein employed. The generally triangulate top wall is denoted at 10, the underlying bottom wall at 12 (FIG. 2) and the rearwardly tapering intervening and connecting side walls at 14. In keeping with the principles of the present invention the nylon or cotton mesh of the top and bottom walls is constructed of relatively fine twine strands to define large holes for free circulation of water. On the other hand the side walls 14 are made of nylon or cotton mesh having larger twine strands and smaller holes to better cope with the shrimp intake and water circulating phase of the matter. It will be evident that the upper and lower lengthwise edges of the side walls 14 are provided with elongated Sampson braided rope or ropes denoted at 16. The leading edge 18 of the top wall is provided with a tautened tight line 20 which terminates at its respective ends in reinforced loops 22. The ropes 16 are provided with similar coacting loops 24 which are connected with terminal loops 26 at upper and lower ends of the vertical braided ropes 28. The manner in which the several loops cooperate to achieve the desired attaching result is shown in FIG. 4 and it will be evident that each of the corner portions of the open mouth of the net is the same in construction, that the loop 24 is connected to the loop 26 and also connected to the third loop 22 by way of a clevis 30 provided with a hitching pin or bolt 32 to be hereinafter more fully described.

Continuing with the net 18 it is to be pointed out that the gradually narrowing and tapered cod end is denoted at 34 and that the restricted discharge end 36 is normally closed by a manually manipulable tie cord or element 38. The junctional portions 40 and 42 (FIG. 1) are provided with an openable and closable noose which is characterized by encircling circumferentially spaced equidistant rings 44 which are between the junctional portions 40 and 42 and through which an end portion 46 of a so-called "lazy" lifting line 48 is passed to provide the gathering and cod end closing result evident it is believed by considering FIGS. 5 and 6 in progressive relationship. The line 48 is provided with one or more floats 50 so that it is constantly buoyed up similar to a float-equipped noose-forming line in a patent to Wilfred M. Bass, 2,744,350, which can be referred to if desired. The forward end 52 is anchored in a manner to be described. In actual practice a lifting line having a hook 54 is lowered from the vessel (not shown) and is connected to the "lazy" line in a manner to form the noose, close the cod end, to trap the contents in the cod end and to thereafter lift the same abroad the vessel in a new generally well-known procedural manner. It will be further noted in connection with the net that the curvate leading end of the bottom wall is also provided with a line 56 provided at suitably spaced points with ground engaging anti-friction rollers 58. It is believed that the construction of the unique trawl net will now be clear.

Taking up now the shrimp trawl net mounting and transporting front-end rig and referring to FIG. 1 it will be seen that this rig is denoted, generally speaking, by the numeral 60. It comprises a rigid suitably elongated rod or tube which constitutes a shaft 62 and which in practice is in a plane midway between the top and bottom walls of the net as evident in particular in FIGS. 2 and 3. In fact this shaft is of a length greater than the lengthwise dimension of the constantly open intake mouth. Each end portion is the same in construction and is provided with a terminal clamp 64 defining a portion here designated as an axle-like journal 66. The hub 68 of a suitable free-turning wheel 70 is mounted between washers 72. The inward washer 72 at the right in FIG. 3 is spaced from a similar washer 74 between which a two-part clamp 76 is mounted. This clamp serves to accommodate an eye or loop 78 (FIG. 2) on a cooperating tow line or bridle 80. The spacing devices or means which prop the end portions of the mouth open are the same at the right and left in FIG. 1 and a description of one will suffice for both. More specifically each means comprises a spreader unit which is denoted at 82. This unit comprises a vertically elongated plate 84 of a length slightly greater than the height of the mouth. The central or hub portion of the plate is connected with a sleeve 86 which is sleeved over an end portion of the shaft and which has one end thereof abutting a limit stop collar or washer 88 on the shaft. The diagonal braces 90 are connected at upper or outer ends to the corresponding end portions of the plate and at inner ends 92 to the sleeve thus providing the desired one-piece multi-part spreader unit. The rearward or trailing edge of each plate (see FIG. 4) is denoted at 94 and is provided with a plurality of selectively usable hitching eyes 96. These eyes are in proper row alignment and the clevis pin or bolt 32 is selectively and adjustably connected thereto in the manner illustrated in FIG. 4. It follows that the respective corner portions of the mouth of the net are connected to upper and lower end portions of the edge 94 thus providing the balanced net-holding result shown. Actually the sleeve portions 82 can rotate or oscillate back and forth on the shaft to provide the desired self-adapting action as the over-all trawl net and rig traverse the bed of the water in the manner suggested in FIG. 1.

The manner in which the component parts of the net 8 and rig 60 are constructed and cooperate is believed to be substantially self-evident from the views of the drawing. In fact, the manner in which the parts are oriented and coordinate for effective results has been set forth in the preceding description. It is believed that a careful consideration of the specification in conjunction with the invention as claimed will enable the reader to obtain a clear and comprehensive understanding of the invention. Accordingly, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a shrimp trawl net embodying a bottom wall, a top wall and complemental longitudinal side walls interposed between and interconnecting the respectively cooperable longitudinal marginal edges of said top and bottom walls, said trawl net having a rearward trailing end attached to and communicating with a companion shrimp collecting and trapping cod end, said cod end having an openable and closable tail end for emptying the catch, the forward end of said trawl net providing a shrimp intake and funneling mouth, a rolling trawl net rig embodying a shaft bridging and spanning said mouth in a plane between said top and bottom walls, the respective terminal ends of said shaft projecting beyond said side walls and providing axle-like journals, transporting wheels mounted for rotation on the respective journals and adapted to engage and traverse the water's bottom, and spreader means operatively mounted on the end portions of said shaft inwardly of the respectively cooperable wheels, cooperating forward end portions of said trawl net walls being operatively connected with said spreader means in a manner that said mouth is constantly maintained in a wide open state regardless of the speed of travel of the accompanying pulling vessel.

2. The combination defined in and according to claim 1, and wherein said wheels are of an outside peripheral diameter comparable and commensurate with the vertical spread of said open mouth, and wherein said wheels while rolling on their journals and traversing a bottom create a vibratory noise as the rig advances and which tends to scare fish away from the place of entry of said mouth, whereby to minimize catching fish and to, in turn, cut down on the shrimp catch handling time.

3. The combination defined in and according to claim 1, and wherein each end portion of said shaft is provided between the spreader means and hub portion of the adjacent wheel with an axle embracing clamp designed and adapted to permit a rearward towing end of a cable-bridle to be operatively connected thereto.

4. The combination defined in and according to claim 1, wherein said shaft, is midway between said top and bottom walls, and tends to partially block and ward off the entry of undesirable cluttering fish into said net via said spread mouth.

5. The combination defined in and according to claim 1, and wherein the leading edge of said top wall is provided from end to end with a constantly tight line which is stretched tautly between the respective spreader means.

6. The combination defined in and according to claim 5, and wherein each spreader means comprises a self-contained one piece unit, said unit embodying a vertically elongated spreader plate having a rearward vertical edge provided with upper and lower sets of hitching eyes, a clevis for each set of eyes, said clevis having a shackling pin shackled to a selected eye, said side walls having upper and lower lengthwise braided ropes and the forward ends of said ropes and the adjacent end of said tight line having terminal loops conjointly linked to and cooperatively anchored on said clevis.

7. The combination defined in and according to claim 6, and wherein each spreader unit also embodies a sleeve at right angles to and fixed at an outer end to a central hub portion of said plate, said sleeve being fittingly sleeved over and rockably cradled for limited angular rotation on a coacting end portion of said shaft and having an inward end abutting a retaining and stop flange fixed for that purpose on said shaft, and diagonal graces interconnecting the upper and lower ends of said plate with an inner end of said sleeve.

8. The combination defined in and according to claim 1, and wherein the mesh of said top wall is provided with larger openings than the openings in the mesh of the side walls, whereby to relieve water pressure via the openings in said top wall.

9. In a shrimp trawl, a rig comprising a horizontally elongated shaft having end portions providing axle-like journals, shaft supporting and trundling wheels each having a hub portion mounted for free rotation on its coacting journal, spreader units, each spreader unit embodying a vertically elongated plate having a centrally apertured portion fixed on an outer end of a right angularly disposed hub-like sleeve, said sleeve being sleeved over and cradled for limited angular rocking on a coacting flanged end of said shaft inwardly of the adjacent wheel, the upper and lower ends of said plate being rigidly connected with the inner end of said sleeve by diagonal rigidifying stays, the upper and lower portions of the rearward edge of said plate having sets of hitching eyes, and a clevis for each set of eyes, said clevis having a hitching and shackling pin detachably shackled to a selected one of said eyes.

10. The shrimp trawl defined in and according to claim 9, and in combination, a shrimp trawling net having mesh top and bottom walls having relatively large openings with outer lengthwise margins joined to coacting upper and lower longitudinal edges of mesh side walls having relatively small openings, the forward ends of said walls having lengthwise bordering ropes terminating in loops, and said loops being conjointly linked to their respectively cooperable clevises.

References Cited
UNITED STATES PATENTS 314,047  3/1885  Moscopoulos _____ 43—9

WARNER H. CAMP, Primary Examiner